US012747832B2

(12) United States Patent
Daniels

(10) Patent No.: US 12,747,832 B2
(45) Date of Patent: Sep. 29, 2026

(54) NITROGEN VAPORIZATION AND INSERTION SYSTEM

(71) Applicant: Nitro Lift Technologies, L.L.C., Mill Creek, OK (US)

(72) Inventor: Danny Kent Daniels, Tishomingo, OK (US)

(73) Assignee: Nitro Lift Technologies, L.L.C., Mill Creek, OK (US)

( * ) Notice: Subject to any disclaimer, the term of this patent is extended or adjusted under 35 U.S.C. 154(b) by 55 days.

(21) Appl. No.: 18/777,752

(22) Filed: Jul. 19, 2024

(65) Prior Publication Data

US 2025/0027613 A1 Jan. 23, 2025

Related U.S. Application Data

(60) Provisional application No. 63/585,135, filed on Sep. 25, 2023, provisional application No. 63/514,602, filed on Jul. 20, 2023.

(51) Int. Cl.
*F17C 7/04* (2006.01)

(52) U.S. Cl.
CPC .......... *F17C 7/04* (2013.01); *F17C 2221/014* (2013.01); *F17C 2223/0161* (2013.01); *F17C 2225/0123* (2013.01); *F17C 2227/0309* (2013.01); *F17C 2227/0337* (2013.01); *F17C 2270/05* (2013.01)

(58) Field of Classification Search
CPC .................. F17C 7/04; F17C 2221/014; F17C 2225/0123
See application file for complete search history.

(56) References Cited

U.S. PATENT DOCUMENTS

2011/0209730 A1* 9/2011 Varrin, Jr. ................. F28G 9/00 134/166 R
2016/0114876 A1* 4/2016 Lee ........................... F17C 7/04 62/48.1
2021/0348840 A1* 11/2021 Guerif ................... F17C 13/005

OTHER PUBLICATIONS

Original and Translation of WO 2011043308 A1; Takada Yasuyuki [JP], Murakami Yukitaka [JP], Woodfield Lloyd Peter [JP], Takada Yasuyuki, Murakami Yukitaka, Woodfield, Lloyd Peter; Apr. 14, 2011.*

* cited by examiner

*Primary Examiner* — Paul J Gray
(74) *Attorney, Agent, or Firm* — Tomlinson Mckinstry, P.C.

(57) ABSTRACT

A system for supplying inert nitrogen gas into a large volume container such as a reactor. The system operates without auxiliary power sources for vaporizing and pressurizing the nitrogen gas. Components include a liquid nitrogen tank, first and second vaporizers, and a heat exchanger. The heat exchanger may include a coil which is coated with hydrophilic material and include spargers. The system is suited for refinery settings, where it can fit into operational environments and reduce carbon emissions. Optional features such as a turboexpander/generator can be incorporated for additional pressurization capabilities and a tempering heat exchanger that can be used to provide fine adjustments to temperature.

13 Claims, 5 Drawing Sheets

NITROGEN VAPORIZATION AND INSERTION SYSTEM

SUMMARY

The present invention is directed to a system for providing inert nitrogen gas into a large volume container. The system comprises a liquid nitrogen tank, a first vaporizer, a second vaporizer, a heat exchanger, a pressure build line, and a conduit system. The first vaporizer is configured to expose an outlet of the liquid nitrogen tank to ambient temperatures to vaporize liquid nitrogen into gaseous nitrogen. The second vaporizer is configured to expose an outlet of the liquid nitrogen tank and the first vaporizer to ambient temperatures to further vaporize remaining liquid nitrogen.

The heat exchanger comprises a coil configured to contain the gaseous nitrogen, a water bath, and a steam stream from a refinery for heating the water bath. The pressure build line returns a portion of the gaseous nitrogen to the liquid nitrogen tank to maintain internal tank pressure and drive flow rate. The conduit system routes the gaseous nitrogen from the liquid nitrogen tank through the first vaporizer, the second vaporizer, the heat exchanger, and into the large volume container.

In another embodiment, the invention is directed to a system for providing inert nitrogen gas to a reactor. The system comprises a liquid nitrogen tank, a vaporizer, a heat exchanger configured to receive a steam stream, a pressure build line connected to the liquid nitrogen tank and the vaporizer, and an exit conduit connected to the heat exchanger. The system defines a nitrogen stream. The nitrogen stream begins at the liquid nitrogen tank and ends at the reactor, and passes through the vaporizer, the heat exchanger, and the exit conduit. A portion of the nitrogen stream is configured to return to the liquid nitrogen tank through the pressure build line.

DETAILED DESCRIPTION

Figure 1:
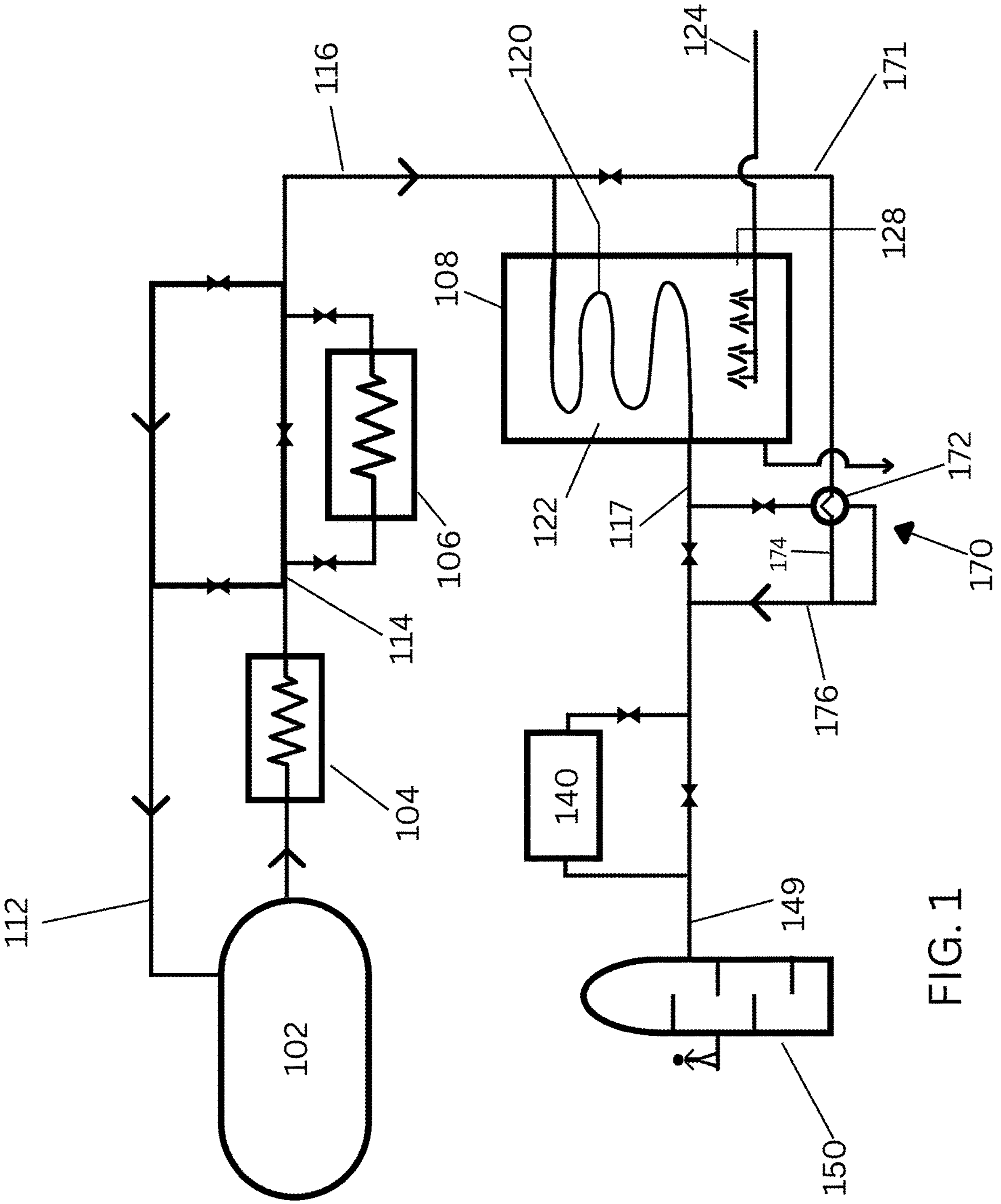
FIG. 1 is a simplified process flow diagram of a system for vaporization of liquid nitrogen and insertion within a reactor vessel. Valves and some conduits have been excised for clarity.

The present invention is directed to a system for providing inert nitrogen gas into a large volume container, such as reactor vessels at refineries, using a skid-mounted liquified nitrogen tank. The system operates without the need for any auxiliary power sources for nitrogen gas vaporization and pressurization. Instead, a specific flow regime maintains high system pressure and flow rates, needed heat from the refinery location itself.

Inert entries are operations in which an operator or technician, wearing personal protective equipment (PPE), enters a reactor vessel to perform maintenance, inspection, or cleaning. Prior to entry, the vessel must be purged of reactive materials, such as oxygen. In addition, temperatures in reactor vessels may be too high for human comfort, or too high for safe replacement of reactant materials, such as catalysts. Therefore, nitrogen gas may be introduced into the vessel to lower the concentration of oxygen to below the threshold required for combustion. The temperature may also be adjusted by the addition of nitrogen, whether to cold temperatures to deactivate reactive materials, or to "room temperature" for the comfort of individuals performing steps within the reactor vessel. Various sensors and monitoring devices may be used to ensure the environment remains inert.

While nitrogen is commonly used to inert a vessel today, such operations typically require the provision of power to expand and heat the inert gas. While PPE protects an operator from most conditions, expansion of liquid nitrogen typically results in rapid cooling as heat is removed from the environment due to nitrogen's high latent heat of vaporization. In order to be useful, therefore, the nitrogen must be at a temperature compatible with human comfort within PPE equipment. Known methods of providing such moderate temperature nitrogen gas from a liquid nitrogen tank require the input of considerable energy, requiring an additional source—usually a diesel or gasoline engine. These sources add carbon and heat to the environment and are usually quite inefficient. In addition, while a cryogenic vessel filled with liquid nitrogen is relatively compact, adding engines, pumps and other apparatus in the confines of an existing plant is a significant space disadvantage.

The elimination of auxiliary power sources offers significant advantages, particularly in refinery settings where space is at a premium due to the presence of numerous fixed conduits and apparatus. Additionally, this system offers environmental benefits by reducing carbon emissions, as it does not require a gas or diesel engine to power a pump. A waste stream from the refinery can also be used to heat the system, making the refinery's carbon emissions more efficient and potentially attractive for regulatory compliance. Often this waste stream consists of high-quality steam.

With reference now to the figures, a system 100 is shown therein. The system 100 comprises a liquid nitrogen tank 102. The liquid nitrogen tank 102 may have a working pressure of 250 psi. As will be discussed herein, liquid nitrogen within the tank 102 is expanded, heated, and otherwise routed through a system of conduits. However, no external energy sources are added to the system, other than a waste stream. All vaporization, expansion, and heating occurs either through exposure to ambient air or the steam waste stream which will be discussed herein.

The system 100 further comprises a first vaporizer 104, a second vaporizer 106, and a heat exchanger 108. The first vaporizer 104 exposes an outlet of the tank 102 to ambient temperatures. Likewise, the second vaporizer 106 exposes an outlet of the tank 102 and the first vaporizer 104 to ambient temperatures. Preferably, the second vaporizer 106 has a high capacity which is not fully utilized—some or all of the second vaporizer can be bypassed. In this way, the second vaporizer 106 can be used as an exhaust in the case of a heating failure within the heat exchanger 108. In such a situation, the additional capacity within the second vaporizer may allow for individuals within an inerted reactor vessel to exit before extremely cold nitrogen enters a system, posing a risk to life and health. Further, the full capacity of the second vaporizer, when used, may warm the nitrogen stream enough that temperatures in a reactor vessel 150 are uncomfortable, but not dangerous or deadly.

Liquid nitrogen is channeled into the first vaporizer 104 via a first conduit 110. In the primary vaporizer 104, the liquid nitrogen expands into its gaseous state. Some of this gaseous nitrogen is returned to the tank 102 through a pressure build line 112 to maintain internal tank 102 pressure. The pressure build line 112 is used to drive the flow rate of the system 100. Flow back to the tank 102 through the pressure build line 112 can be adjusted to achieve desired flow rate and temperature characteristics.

From there, nitrogen may flow into the second vaporizer 106 via conduit 114. Remaining liquid nitrogen is vaporized here, adding more volume to the gaseous nitrogen. As discussed above, the second vaporizer 106 may run at diminished capacity, to allow excess capacity to be utilized in the case of a heating failure.

Similar to the first vaporizer 104, a fraction of this gas is returned to the pressure build line 112. The rest of the nitrogen, still in a low-temperature but gaseous state, is channeled into the heat exchanger 108 via conduit 116.

The heat exchanger 108 comprises a coil 120, a water bath 122, and a steam stream 124. The water bath 122 is heated by the steam stream 124. Preferably, the steam stream 124 is a high quality steam originating from the refinery itself, and is directed to the heat exchanger 108 prior to being exhausted.

The coil 120 contains the gaseous nitrogen stream. The coil 120 is preferably made of a stainless steel material. Preferably, the wettability of the coil 120 is increased through the application of a nano-layer of hydrophilic material. Such enhanced wettability increases the efficiency of the contact between the water bath 122 and coil 120, improving heat transfer. For example, untreated, droplets of liquid may only contact stainless steel along a small contact surface, resulting in decreased heat transfer. With wettability increased, the contact angle between water droplets and the coil 120 may be five to eleven degrees. Such low contact angles produce a contact surface between the droplet and the coil 120 which allows a much greater transfer of heat per volume of water.

Wettability enhancement may be achieved using off-the-shelf hydrophilic materials such as those provided by Aculon or other suppliers. Such coatings are preferably non-insulating.

One of the challenges in efficient heat transfer is overcoming the Leidenfrost effect, a phenomenon where a liquid produces an insulating vapor layer upon coming into contact with a surface that is significantly hotter than its boiling point. This vapor layer prevents direct contact between the liquid and the hot surface, thus impeding efficient heat transfer. To address this challenge, the heat exchanger **1*o*8 is equipped with spargers 128. These spargers 128 are essentially flattened sections that disrupt the steam as it enters the water bath 122, causing turbulent flow of the steam through the water bath and enhancing direct contact between the heat transfer medium (water bath 122) and the coil 120**. The direct contact promotes efficient heat transfer by allowing a higher rate of thermal conduction, as gaseous layers—even very hot ones—tend to be poor conductors of heat.

Figure 2:
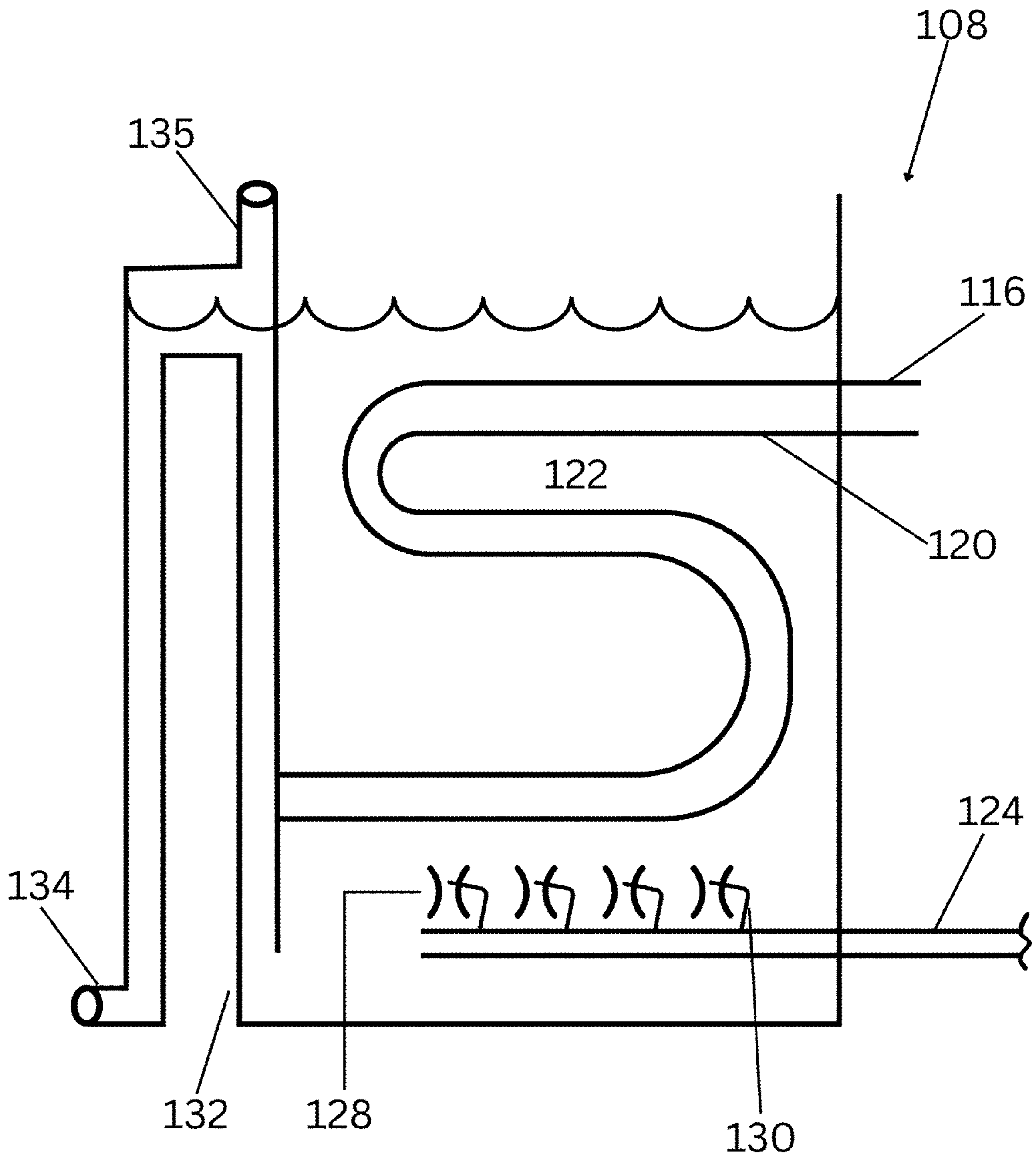
FIG. 2 is a diagram of the heat exchanger for use with the system.

Steam impacts the spargers 128 at an angle through outlets 130. Preferably, the outlets 130 are angled such that steam impacts the spargers 128, encouraging diffusion of heat into the water bath 122. The heat exchanger 108 may comprise a water leg 132. The height of the water leg 132 becomes the maximum height of the water bath 122. As steam from the inlet 124 is incorporated into the water bath 122, it condenses and raises the level of water in the heat exchanger 108 and water leg 132. When the level becomes high enough, as shown in FIG. 2, water exits through an outlet 134. The outlet 134 may also have a vent 135.

The warmed, pressurized nitrogen leaves the steam water bath 122 into exit conduit 117. Flow rate and temperature can be regulated using valves between the elements of the system and the various conduits. It should be understood that inert nitrogen gas at a temperature compatible with human comfort may be conducive to the use of such gasses in process, such as inert entries, where operators will be in the presence of the gas.

Figure 3:
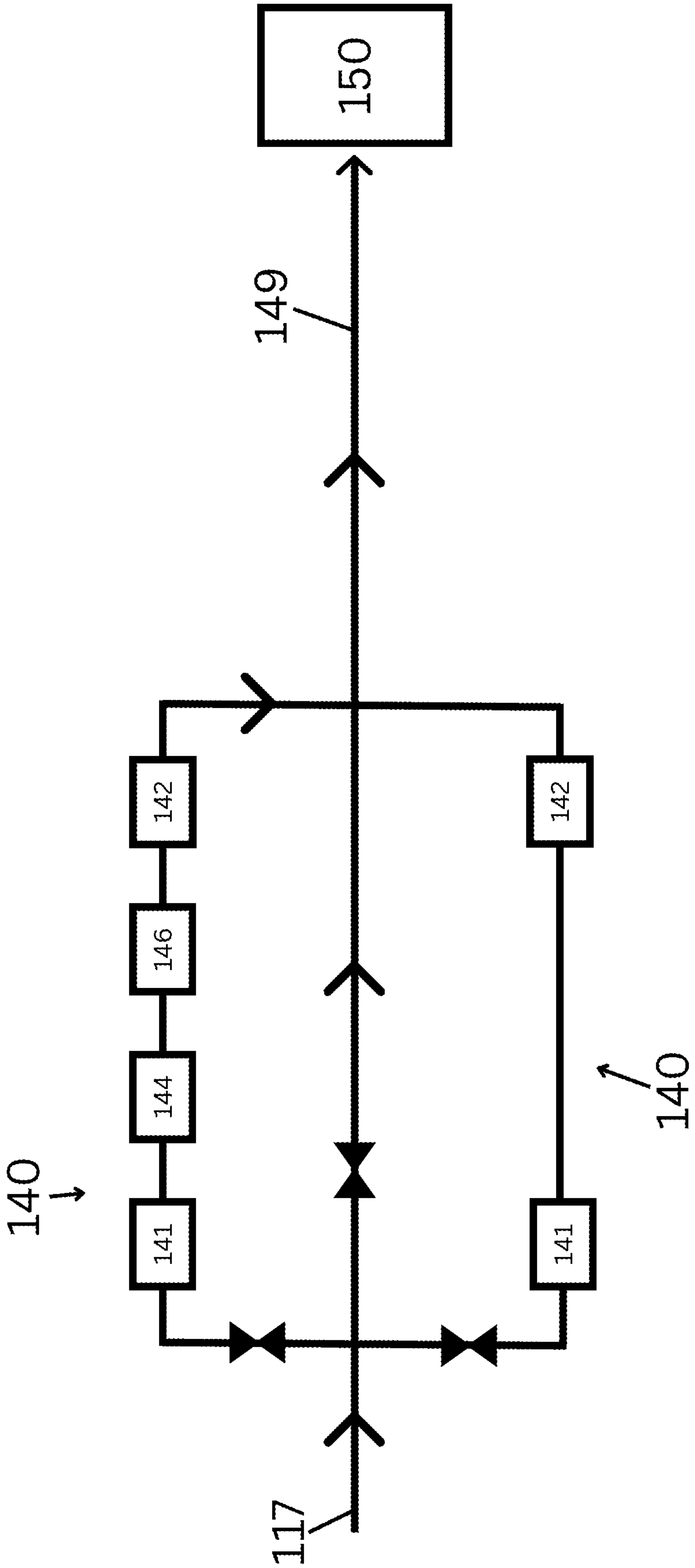
FIG. 3 is a diagram of an optional pressurization system for use with the system.

While the nitrogen in conduit 117 may be suitable for most purposes, in some cases the gas may need to be made a higher pressure. Further expanders may be utilized to power a pump for further pressurization. Essentially, flow rate is sacrificed for pressure in such a scenario. A pressurization system 140 may optionally be utilized to pressurize nitrogen in such a situation. In FIG. 3, two such systems 140 use a turboexpander/generator 141. Such a turboexpander 141 may directly power a pump 142 for pressurizing a primary nitrogen flow or, conversely, the turboexpander/generator 141 may be used to charge a rechargeable battery 144, such as a lithium ion battery, which is then used to power an electric motor 146 which drives the pump 142.

A suitable turboexpander 141 may be an off-the shelf model. The generator 141 may be an in-pipe turbine generator which converts flowrate into energy. When pressure goals are met by the pressurization system 140, pressurized nitrogen may be placed into reactor inlet stream 149 for use in inerting the reactor vessel 150.

Figure 4:
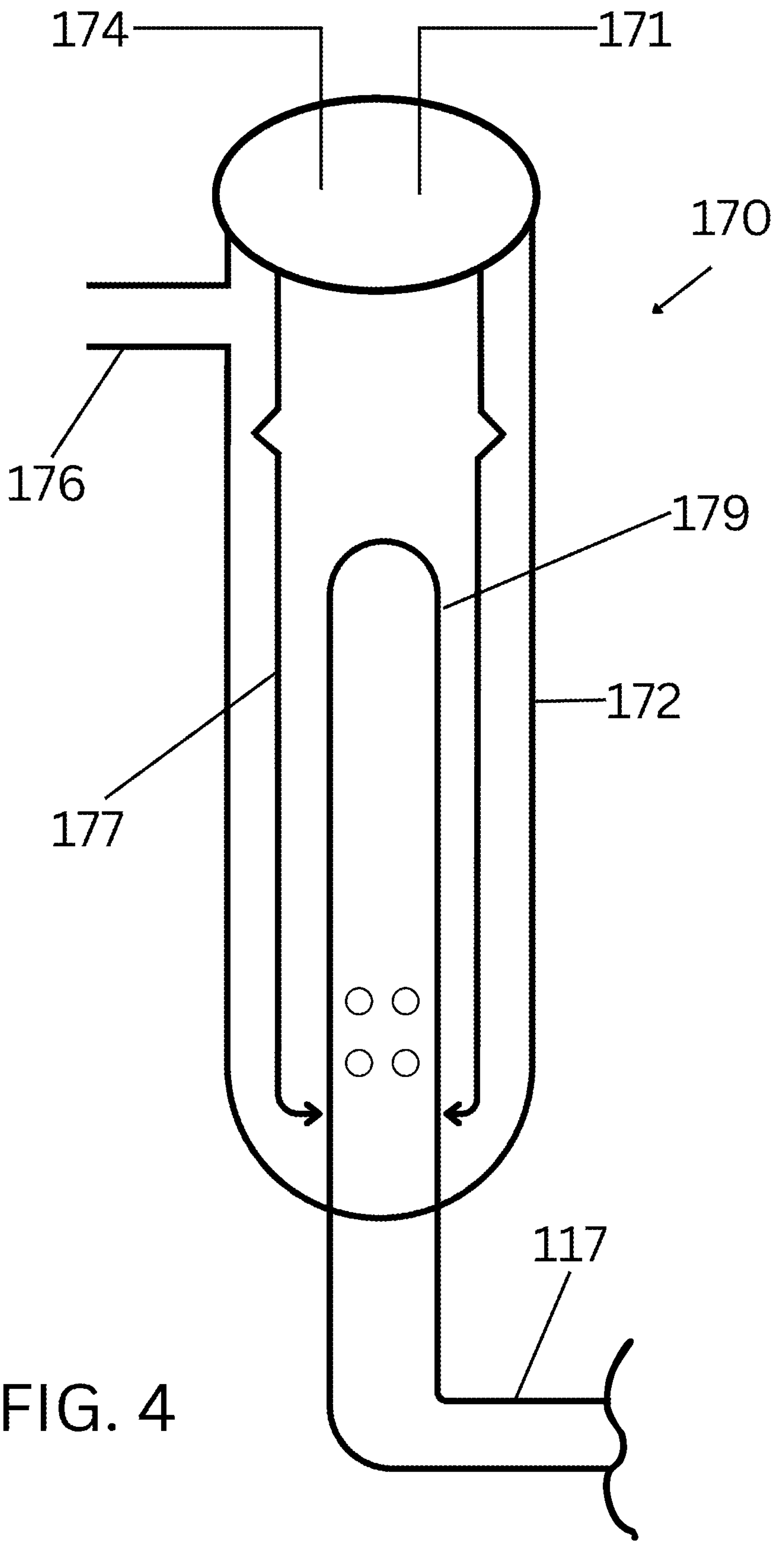
FIG. 4 is a diagram of a cooling system for use with the system.
Figure 5:
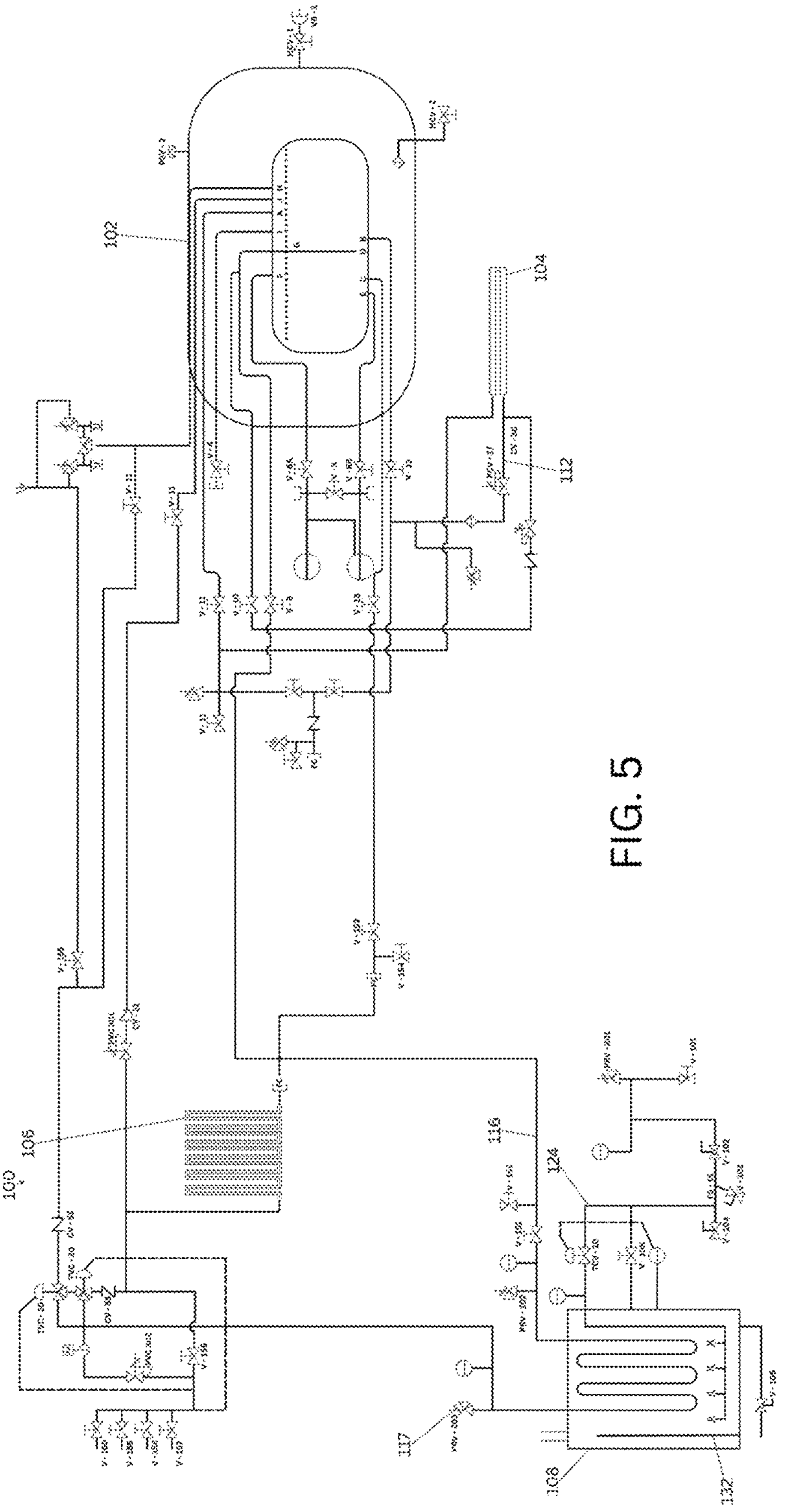
FIG. 5 is a detailed schematic of the vaporization system.

Additionally, some applications of the system 100 may require auxiliary cooling for the nitrogen in conduit 117. For example, nitrogen in conduit 117 may be at the proper flowrate and pressure for inerting activities, but a portion of the process may require the temperature to be lowered for a period of time. With reference to FIG. 1 and FIG. 4, a supplemental cooling system 170 is shown. The cooling system 170 is used to "temper" the nitrogen in conduit 117, and is referred to herein as a spiral tempering heat exchanger 172. The supplemental cooling system 170 comprises a slip stream 171 taken from conduit 116. This slip stream 171 will be cold, unheated nitrogen gas taken from a portion of the process flow prior to heating by steam in exchanger 108. A portion, or all, of the heated gas in conduit 117 is routed through the tempering heat exchanger 172.

The tempering heat exchanger 172 is a counter-flow shell and tube heat exchanger, with warm gas entering from conduit 117 and being routed past tubes containing cold gas from slip stream 171. The tubes 177 within the exchanger 172 may be coated with material for enhanced wettability, as in exchanger 108, to take advantage of the cooling associated with any nitrogen droplets remaining in slip stream 171 after expansion. An artisan will understand that materials which enhance wettability of materials for nitrogen droplets may be different than those which enhance wettability for water droplets.

As shown in FIG. 4, the tubes 177 form a loop, but it should be understood that the tubes 177 more preferably spiral along all or substantially all of the height of exchanger 172. The tempering heat exchanger 172 comprises a pipe nipple 179 at the inlet of conduit 117. The pipe nipple 179 disrupts flow and allows warmer nitrogen to enter the body of tempering heat exchanger 172 at a bottom end, lengthening residence time to allow for maximum heat exchange between the nitrogen and the tubes 177.

Inlet stream 117 will be cooled in tempering heat exchanger 172, while slip stream 171 will be warmed. Preferably, both outlets 174, 176 will reenter the primary reactor inlet 149 for use in the inerting procedure.

Preferably, the reactor inlet stream 149 and the reactor vessel 150 are monitored for temperature and pressure. Many modifications may be made to the system 100 to adjust conditions in the reactor vessel 15*o*. For example, if a higher flowrate is needed, more nitrogen may be placed in the pressure build line 112, which provides power (through pressure) to drive liquid nitrogen from the tank 102. In addition, nitrogen may be routed from primary conduits into or away from the supplemental cooling system 170 to adjust reactor temperature. The optional pressurization system 140 may be utilized if higher pressure is desired. And if a failure of the heat exchanger 108 occurs, through disruption of the steam inlet 124 or otherwise, the capacity of the second vaporizer 106 may be increased to increase the reactor vessel 150 temperature by providing more exposure to ambient temperatures between the liquid nitrogen's outlet from the tank 102 and the reactor vessel 150.

In operation, the tank 102 is provided as a portable and convenient supply of inert nitrogen. Liquid nitrogen is vaporized, to form a very cold nitrogen gas. A portion of this gas is routed through the pressure build line 112 to selectively drive flowrate. Heat is added to the cold nitrogen gas by routing the gas stream through a pipe within a heat exchanger. The heat exchanger is provided with a waste steam stream from the refinery or power plant at which a reactor is being inerted.

Steam from the waste steam stream is used within a water bath to warm the nitrogen gas stream. Pressure and temperature can be fine-tuned by using other auxiliary systems. For example, if catalysts are being used in the reactor vessel 150 which require cold temperatures, the cooling system can be used to reduce the internal temperature in a reactor from over 100 degrees fahrenheit to near 0 degrees. Preferably, during inerting operations both the pressure and temperature within the reactor vessel 150 are kept within ranges optimal for human comfort.

Each of the tank 102, the vaporizers 104, 106, and the heat exchanger 108 are capable of being skid mounted, or, preferably, are transported while skid mounted and movable by a fork or crane. Further, the skids are sized such that each of these elements can be placed on a trailer for transportation to other locations. As a result, the system 100 can be quite portable and its components can fit into tight locations, such as may exist near the steam stream 124. By allowing the components 102, 104, 108 to be placed modularly into existing space, a single system 100 may be used to provide inert nitrogen to many reactors.

Various modifications may be made to this invention without departing from its spirit. For example, the sizes of conduits, flowrates, and the like may be adjusted depending upon the application. Nitrogen may be used to remove reaction gasses from reactors in a refinery or power plant using this invention. In addition, other applications may be useful, such as a pressurized motive force for a pig within a hydrocarbon pipeline.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A system for providing inert nitrogen gas to a reactor, comprising:
- a liquid nitrogen tank;
- a vaporizer;
- a first heat exchanger, wherein the first heat exchanger is configured to receive a steam stream;
- a pressure build line connected to the liquid nitrogen tank and the vaporizer; and
- an exit conduit connected to the first heat exchanger, the exit conduit configured for connection to a reactor;
- wherein the system defines a nitrogen stream, wherein:
  - the nitrogen stream begins at the liquid nitrogen tank and ends at the reactor, and passes through the vaporizer, the first heat exchanger, and the exit conduit; and
  - a portion of the nitrogen stream is configured to return to the liquid nitrogen tank through the pressure build line;
- and further comprising a system for cooling the nitrogen stream within the exit conduit, the system for cooling the nitrogen stream comprising:
  - a tempering heat exchanger comprising:
  - a first inlet of the nitrogen stream, wherein the nitrogen stream is received at the first inlet from the exit conduit;
  - a first outlet of the nitrogen stream; and
  - a coil containing a nitrogen slip stream, wherein the nitrogen slip stream is removed from the nitrogen stream prior to entering the first heat exchanger.

2. The system of claim 1 in which the liquid nitrogen tank has a working pressure of 250 psi.

3. The system of claim 1, wherein the first heat exchanger comprises a coil made of stainless steel.

4. The system of claim 3, wherein a wettability of the coil is increased through the application of a nano-layer of hydrophilic material.

5. The system of claim 4, wherein the first heat exchanger is configured to receive the steam stream within a water bath, wherein the first heat exchanger includes spargers proximate an inlet of the steam stream.

6. The system of claim 1 wherein the steam stream is a waste stream from a refinery.

7. The system of claim 1, further comprising a turboexpander connected to the exit conduit for pressurizing the nitrogen stream.

8. The system of claim 1 wherein heat sources consist essentially of the steam stream and ambient temperatures surrounding the vaporizer.

9. A method of using a system comprising:
- a liquid nitrogen tank;
- a vaporizer;
- a heat exchanger, wherein the heat exchanger is configured to receive a steam stream;
- a pressure build line connected to the liquid nitrogen tank and the vaporizer; and
- an exit conduit connected to the heat exchanger, the exit conduit configured for connection to a reactor;
- wherein the system defines a nitrogen stream, wherein:
  - the nitrogen stream begins at the liquid nitrogen tank and ends at the reactor, and passes through the vaporizer, the heat exchanger, and the exit conduit; and a portion of the nitrogen stream is configured to return to the liquid nitrogen tank through the pressure build line;

the method comprising:

providing liquid nitrogen within the liquid nitrogen tank;

using heat sources, vaporizing and heating the liquid nitrogen in the vaporizer and heat exchanger to form a nitrogen gas stream; and using the nitrogen gas stream to remove reaction gasses from the reactor in the refinery.

10. The method of claim 9 further comprising:

providing a steam stream at the heat exchanger;

wherein the steam stream is an outlet stream at the refinery.

11. The method of claim 9 further comprising returning a portion of the nitrogen gas stream to the liquid nitrogen tank, thereby increasing a flowrate of the liquid nitrogen.

12. The method of claim 9 wherein the heat exchanger comprises a water bath, and further comprising:

providing a steam stream into the water bath such that the steam stream is disrupted by at least one sparger.

13. The method of claim 10 further comprising:

providing a cooling system configured to exchange heat between the nitrogen gas stream prior to entering and after exiting the heat exchanger;

providing a pressurization system, configured to add pressure to the nitrogen gas stream by converting a flowrate of the nitrogen gas stream into pressure; and adjusting a temperature and the pressure within the reactor by adjusting flowrate through one or more of the cooling system and the pressurization system.

* * * * *